(12) United States Patent
Siebelink, Jr. et al.

(10) Patent No.: US 6,283,540 B1
(45) Date of Patent: Sep. 4, 2001

(54) PLASTIC PANEL ASSEMBLY FOR USE IN A VEHICLE

(75) Inventors: Robert John Siebelink, Jr., Ann Arbor; Lloyd G. Racine, Shelby Township, both of MI (US)

(73) Assignee: Webasto Sunroofs, Inc., Rochester Hills, MI (US)

( * ) Notice: Subject to any disclaimer, the term of this patent is extended or adjusted under 35 U.S.C. 154(b) by 0 days.

(21) Appl. No.: 08/915,944

(22) Filed: Aug. 21, 1997

Related U.S. Application Data

(62) Division of application No. 08/503,013, filed on Jul. 17, 1995, now Pat. No. 5,702,779.

(51) Int. Cl.⁷ .............. B60J 7/043; E04B 1/343
(52) U.S. Cl. .............. 296/191; 296/216.09; 296/216.06; 52/573.1; 52/309.13
(58) Field of Search ................. 296/191, 901, 296/216.09, 216.06; 52/573.1, 309.13

(56) References Cited

U.S. PATENT DOCUMENTS

| | | | | |
|---|---|---|---|---|
| 2,778,071 | * | 1/1957 | Anderson | 52/309.13 |
| 2,892,516 | * | 6/1959 | Kessler | 52/309.13 |
| 3,274,721 | * | 9/1966 | Dreyer | 40/771 |
| 3,970,343 | | 7/1976 | Horn . | |
| 4,050,200 | * | 9/1977 | Beck, Jr. | 296/216.09 |
| 4,115,974 | * | 9/1978 | Purcell | 52/512 |
| 4,154,474 | | 5/1979 | Hough et al. . | |
| 4,398,984 | * | 8/1983 | Uchiyama et al. | 296/191 |
| 4,402,537 | * | 9/1983 | Gallitzendorfer et al. | 296/191 |
| 4,564,232 | * | 1/1986 | Fujimori et al. | 296/191 |
| 4,573,733 | * | 3/1986 | Zaydel | 296/191 |
| 4,860,511 | * | 8/1989 | Weisner et al. | 52/200 |
| 4,919,470 | * | 4/1990 | Muller | 296/901 |
| 4,973,102 | * | 11/1990 | Bien | 296/901 |
| 5,046,779 | | 9/1991 | Ichinose et al. . | |
| 5,295,342 | * | 3/1994 | Roche et al. | 428/14 X |
| 5,320,151 | * | 6/1994 | Wumer | 296/901 |
| 5,358,302 | * | 10/1994 | Schoen et al. | 52/573.1 |
| 5,429,412 | * | 7/1995 | Schoen et al. | 296/901 |
| 5,606,829 | * | 3/1997 | Hararat-Tehrani | 52/573.1 |
| 5,667,868 | * | 9/1997 | Freeman | 296/191 |
| 5,702,779 | * | 12/1997 | Siebelink, Jr. et al. | 296/191 |
| 5,830,559 | * | 11/1998 | Goldbach et al. | 296/191 |
| 6,055,977 | * | 5/2000 | Linard | 52/573.1 |

* cited by examiner

*Primary Examiner*—D. Glenn Dayoan
*Assistant Examiner*—Hilary Gutman
(74) *Attorney, Agent, or Firm*—Pillsbury Winthrop LLP

(57) ABSTRACT

A plastic panel assembly for use in a vehicle is provided including a sheet metal frame constructed and arranged to be coupled to a vehicle and a plastic panel mounted to the sheet metal frame. The plastic panel includes a plurality of pin members extending from a surface thereof and the frame includes a plurality of openings therethrough such that one pin member is disposed through an associated opening. Fastening structure is constructed and arranged with respect to the pin members to retain the plastic panel to the frame so that the panel is prevented from moving relative to the frame in a direction of extension of the pin members while the panel is permitted to move relative to the frame in a direction transverse to the direction of extension of the pin members, upon thermal expansion of the panel.

1 Claim, 5 Drawing Sheets

PLASTIC PANEL ASSEMBLY FOR USE IN A VEHICLE

This is a divisional application of U.S. patent application Ser. No. 08/503,013 filed Jul. 17, 1995, now U.S. Pat. No. 5,702,779. This invention relates to plastic panel assemblies and, more particularly, to plastic panel assemblies for use in vehicles.

With the development of new plastic materials, it is now possible to replace conventional glass panels used in vehicles with light-weight, transparent plastic panel assemblies. For example, fixed vehicle windows may be replaced with plastic panel assemblies. Further, a plastic roof panel may be employed in a sunroof assembly mounted for movement between a closed position with respect to a roof opening and a fully opened position, or a venting position where a rear end of the panel is tilted upwardly with respect to the vehicle roof. Alternatively, the sunroof assembly may be of the type whereby the plastic roof panel may be removed completely from the opening and moved to storage.

The use of plastic panels has been limited due to the thermal expansion properties of plastic material. Plastic panels, when used in vehicles, are exposed to a wide range of temperatures. Thus, thermal expansion of the plastic panel must be accounted for when mounted to a sheet metal frame. To compensate for thermal expansion of the plastic panel, the panel must be mounted so as to be capable of moving relative to the sheet metal frame.

Accordingly, a need exists to provide a plastic panel assembly wherein the plastic panel of the assembly is mounted to a sheet metal frame such that the plastic panel may move relative to the frame in at least one direction upon thermal expansion of the plastic panel.

An object of the present invention is to fulfill the need expressed above. In accordance with the principles of the present invention, this objective is accomplished by providing a plastic panel assembly for use in a vehicle including a sheet metal frame having a central opening therein, and a plastic panel mounted to the sheet metal frame so as to cover the central opening. The plastic panel includes a plurality of pin members extending from a surface thereof and the frame includes a plurality of openings therethrough such that one pin member is disposed through an associated opening. Fastening structure is constructed and arranged with respect to the pin members to retain the plastic panel to the frame so that the panel is prevented from moving relative to the frame in a direction of extension of the pin members while the panel is permitted to move relative to the frame in at least one direction transverse to the direction of extension of the pin members, upon thermal expansion of the panel.

In accordance with another aspect of the invention, a method of compensating for thermal expansion of a plastic panel mounted to a sheet metal frame is provided. The method includes fastening the plastic panel to the frame with a fastening structure. The fastening structure is operatively associated with pin members of the panel which are disposed in slots defined in the frame. Thus, the plastic panel is fixed to the frame and prevented from moving in a direction of extension of the pin members. However, the panel is permitted to move relative to the frame due to thermal expansion of the panel, in at least one direction transverse to the direction of extension of the pin members.

These and other objects of the present invention will become more apparent during the course of the following detailed description and appended claims. The invention may thus be understood with reference to the accompanying drawings wherein an illustrative embodiment is shown.

Referring now more particularly to the drawings, there is shown in FIGS. 1–4 a plastic panel assembly, generally indicated at 10, which includes a plastic panel 12, preferably of polycarbonate material, and a sheet metal frame, generally indicated at 14, embodying the principles of the present invention. In the illustrated embodiment of FIGS. 3–5 and 7, the plastic panel assembly 10 is shown mounted in an opening 16 of a vehicle roof 18 and is employed as a movable sunroof panel.

Figure 2:
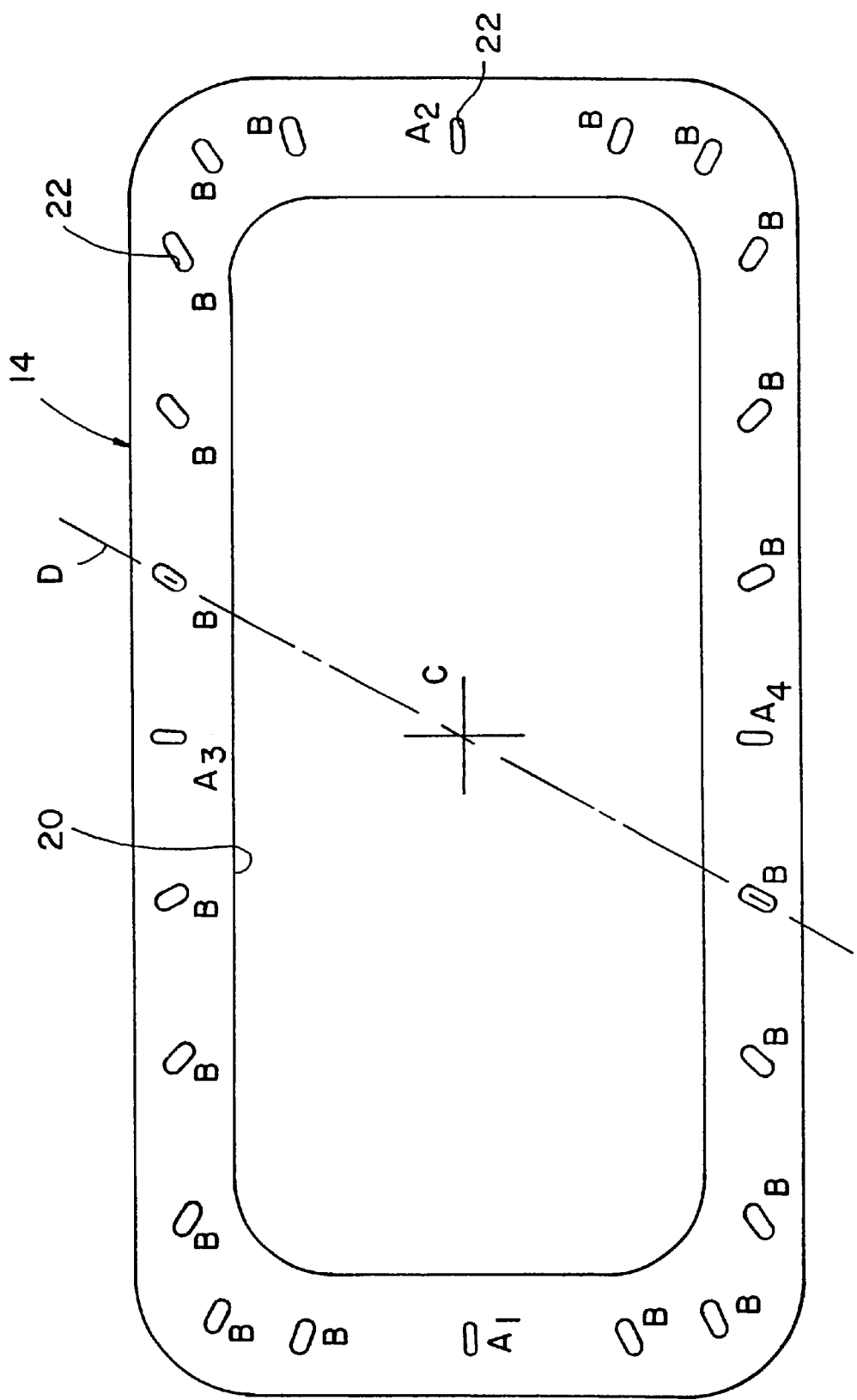
FIG. 2 is a plan view of a sheet metal frame showing the orientation of mounting slots for receiving pin members of a plastic panel.
Figure 3:
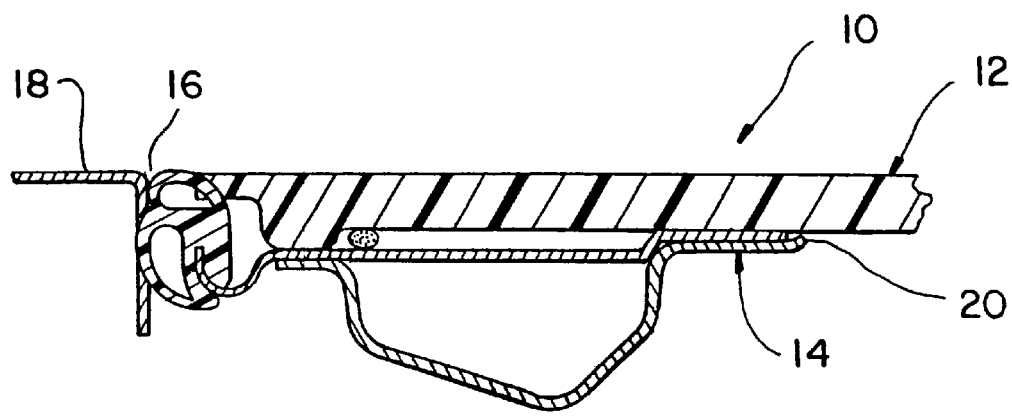
FIG. 3 is a partial, cross-sectional view of the plastic panel assembly provided in accordance with the principles of the present invention, shown mounted in an opening of a vehicle roof defining a sunroof panel.
Figure 4:
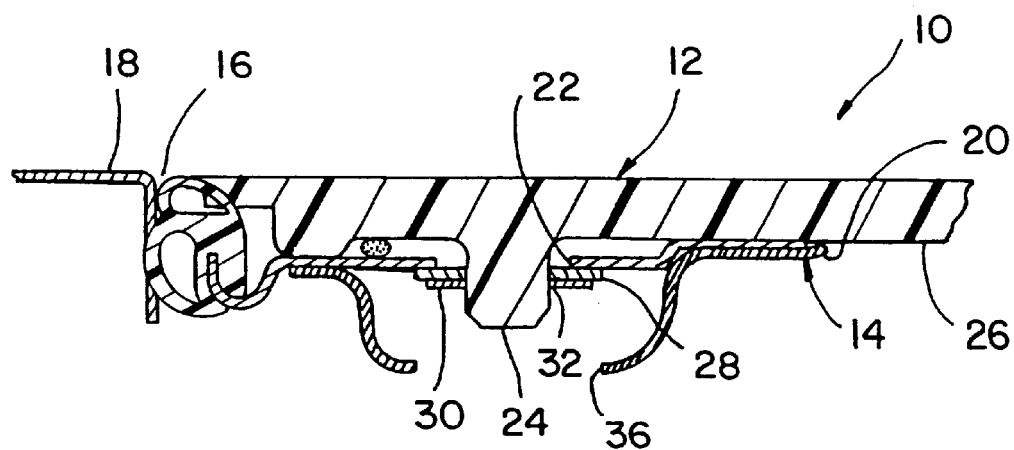
FIG. 4 is a partial, cross-sectional view of the assembly of FIG. 3 at a pin location.
Figure 5:
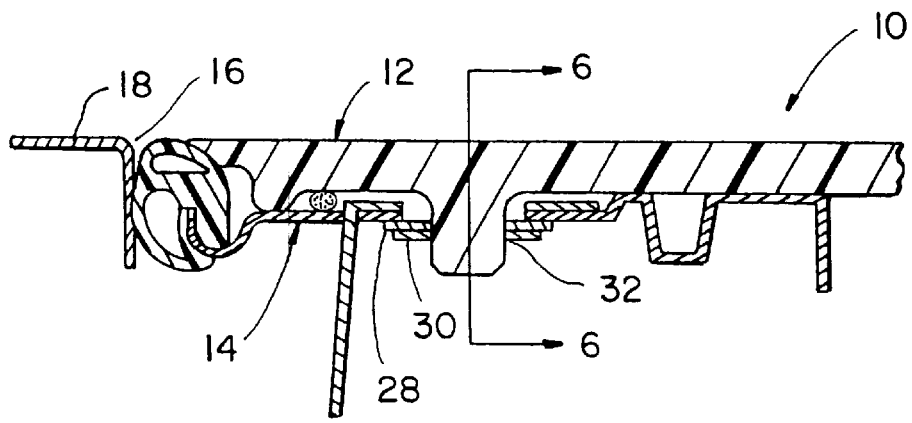
FIG. 5 is a sectional view of a side of the plastic panel assembly of FIG. 3.
Figure 6:
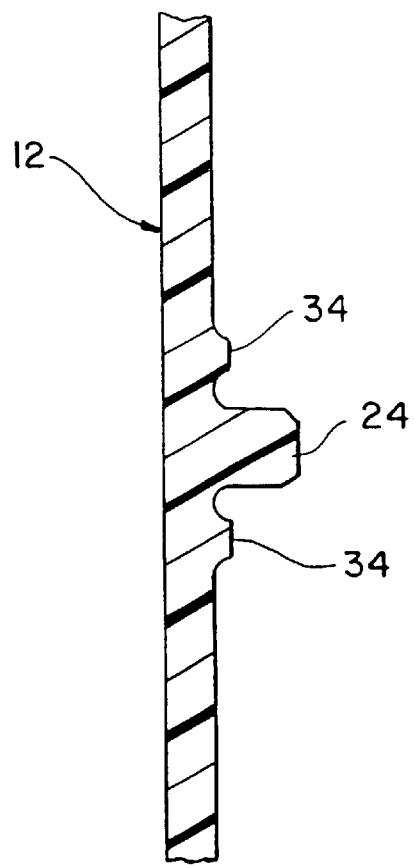
FIG. 6 is a sectional view of the plastic panel of the assembly taken along the line 6—6 of FIG. 5.

As shown in FIG. 2, the sheet-metal frame 14 is of generally rectangular configuration having a central opening 20 therein. The frame 14 includes a plurality of spaced openings or slots 22 therein which are used for mounting the plastic panel 12 to the frame 14 so that the panel 12 covers the central opening 20. Since thermal expansion occurs evenly in all directions and in an amorphous material, such as plastic, the slots 22 are arranged radially from the center point C of the frame 14 or opening 20. Thus, the longitudinal axis D of each slot 22 passes through the center point C. Further, all of the slots 22 are constructed and arranged to receive a generally cylindrical pin member or pin 24, extending from a bottom surface 26 of the plastic panel 12, as best shown in FIGS. 4–6. All cylindrical pins 24 have diameters of equal size.

Figure 1:
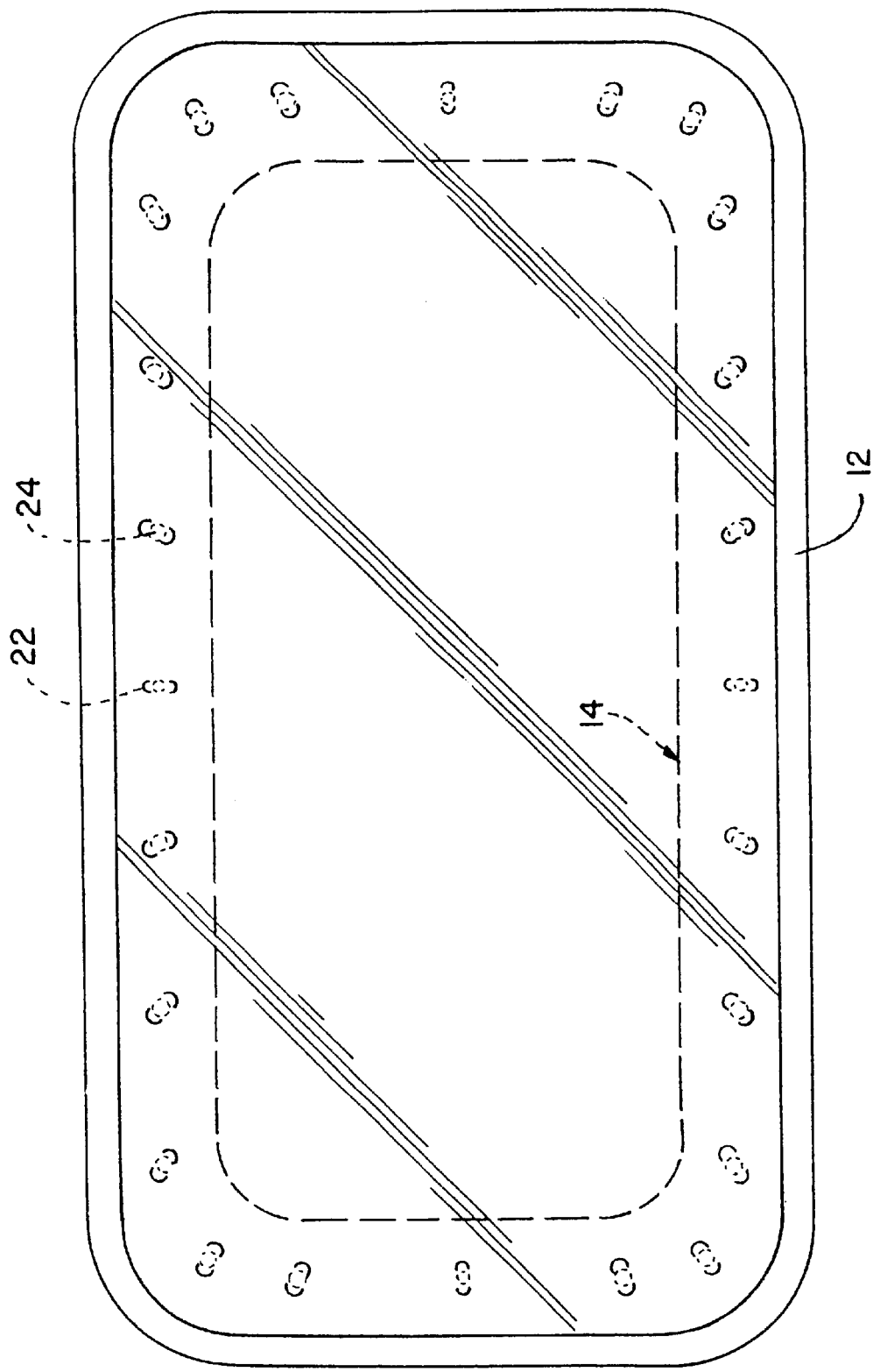
FIG. 1 is a plan view of a plastic panel assembly provided in accordance with the principles of the present invention.

In the illustrated embodiment, the pins 24 are made integral with the plastic panel 12. However, it can be appreciated that the pins 24 may be formed as a separate part which may be coupled to the bottom surface 26 of the plastic panel 12. The plastic panel 12 is also of generally rectangular configuration and the pins 24 are located in a peripheral portion thereof so that the plastic panel 12 may be secured to the frame 14, covering central opening 20. Thus, in the illustrated embodiment, edges of the panel 12 are flush with edges of the frame 14 (FIG. 1). The plastic panel 12 is fixed from movement in the X-direction (FIG. 2) by slots $A_3$ and $A_4$, and is fixed from Y-direction movement by slots $A_1$ and $A_3$. Thus, slots $A_1$ through $A_4$ are locating slots since they locate the plastic panel 12 with respect to the frame 14. It can be appreciated that a minimum of three locating slots are required to properly locate the plastic panel 12 with respect to the frame 14. In the illustrated embodiment, however, four slots are provided. Slots B as shown in FIG. 2 are clearance slots for the purpose of permitting movement of the plastic panel 12 relative to the frame 14, as detailed further below. In the illustrated embodiment, the locating slots $A_1$ through $A_4$ have a width less than the width of the clearance slots B, providing increased accuracy in locating the panel 12 with respect to the frame 14 and to ensure that the panel 12 is fixed in the X and Y direction by the pins 24 as noted above. A line-to-line fit results when pins are disposed in slots $A_1$ through $A_4$.

With reference to FIGS. 1, 4 and 5, mounting of the plastic panel 12 to the sheet metal frame 14 will be appreciated. As shown, each pin 24 is associated with a respective slot 22 such that each pin 24 extends through each slot 22. Fastening structure, in the form of a washer 28 and fastener 30 secure the panel 12 to the frame 14. First, slip washer 28 having a bore therethrough is disposed over each pin 24. Next, the fastener 30 of generally disc-shape and having barbs 32 extending from a surface thereof is used to secure the plastic panel 12 to the frame 14. The fasteners 30 have a bore therethrough sized to receive an associated pin 24. Fastener 30 is easy to assemble and provides a securing function without adding a compressive. force component upon fastening. This feature aids in the sliding of the plastic panel 12 relative to the sheet metal frame 14, as will become apparent below. The washer 28, preferably of TEFLON®, reduces friction between the plastic panel 12 and the sheet metal frame 14. Thus, as shown in FIGS. 4 and 5, the barbs 32 of the fastener 30 engage the peripheral surface of the pin 24 so as to prevent the washer 28 and fastener 30 from disengaging from the pin 24. Further, with the fastener 30 firmly in place, the washer 28 is sandwiched between the frame 14 and the fastener 30. Thus, the panel 12 is secured rigidly to the frame 14 in the direction of extension of the pins 24. However, upon thermal expansion of the plastic panel 12, the plastic panel 12 is free to move radially with respect to the center of the frame C, to accommodate thermal expansion of the panel 12. Thus, the panel 12 is free to move in a direction transverse to the extension direction of the pins 24, but only radially with respect to the center point C of the frame 14, since the panel is fixed in the X and Y directions in slots $A_1$ through $A_4$.

As shown in FIG. 6, pads 34 are disposed adjacent each pin 24 to provide a bearing surface to the frame 14 opposing the washer 28 on the other side of the frame 14.

To facilitate assembly of the fasteners 30 and washers 28 to the pins, the frame 14 includes cut-outs 36 therein as shown in FIG. 4 providing access to the pins.

Although the illustrated embodiment shows the pins 24 extending from the surface 26 of the plastic panel 12 and the frame 14 includes the slots 22 therein, it can be appreciated that the pins 24 could be coupled to or integral with the frame 14, while the plastic panel integrates the slots 22.

Figure 7:
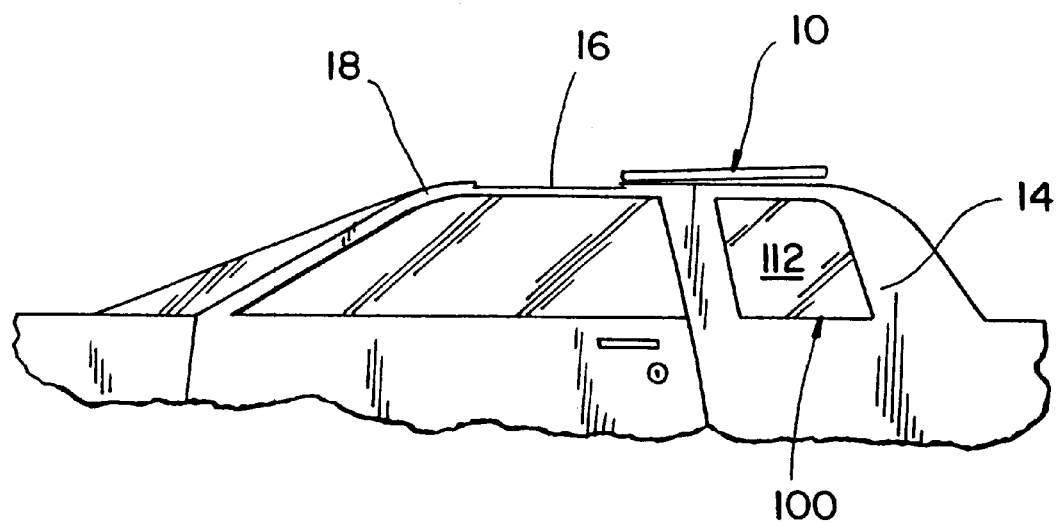
FIG. 7 is a side view of a vehicle employing the plastic panel assembly of the invention in a sunroof assembly and as a side window.

As noted above, the plastic panel assembly 10 of the invention can be utilized in other vehicle applications, such as vehicle windows. Thus, it is within the contemplation of the invention to provide a plastic panel assembly for use as a fixed vehicle window such as a vehicle rear window or immovable side windows. The assembly may include the sheet metal frame 14 of FIG. 2, which can be coupled to the vehicle or, the sheet metal frame 14 may be made integral with the vehicle frame. FIG. 7 shows the assembly 100 employed in a side window, including a plastic panel 112 mounted to the vehicle frame 14, with the pins of the panel 112 secured to the slots of the frame 14 by the fastening structure, in the manner discussed above.

In certain circumstances, particularly when the assembly is employed as a vehicle window, it is preferable that the assembly be covered around its entire periphery to contain the attachment between the plastic panel and frame thereby providing peripheral stability to the assembly.

It can be appreciated that the plastic panel may be coated with a protective coating or covering to reduce or prevent surface scratches therein.

It thus will be seen that the objects of this invention have been fully and effectively accomplished. It will be realized, however, that the foregoing preferred embodiment has been shown and described for the purpose of this invention and is subject to change without departure from such principles. Therefore, this invention includes all modifications encompassed within the spirit and scope of the following claims.

What is claimed is:

1. A method of compensating for thermal expansion and contraction of a plastic panel structure mounted to a frame structure, said frame structure having a coefficient of thermal expansion less than that of said plastic panel structure and defining a central opening therein being disposed in a plane, said plastic panel structure being disposed with respect to said frame structure so that a marginal peripheral portion of said plastic panel structure extending generally in the direction of extent of said plane is coextensive with a marginal peripheral portion of said frame structure and a central portion thereof extends in covering relation with said central opening, the method including:

providing a series of at least three pin and slot connections extending operatively between the coextensive peripheral portions of said plastic panel and frame structures and disposed in spaced relation therealong for retaining the coextensive peripheral portions of said plastic panel and frame structures together, each of the at least three pin and slot connections including a slot formed in one of said plastic panel and frame structures and a pin provided on the other of the plastic panel and frame structures, each said pin extending transversely through a respective slot formed in said one of said plastic panel and frame structures, each said slot having a longitudinal axis extending in a direction toward a common point disposed within said central opening, preventing relative movement of said pins within respective slots along said plane in one direction within which the at least three pin and slot connections are disposed while allowing relative movement of said pins within respective slots along said plane generally in directions away from and toward said common point, and enabling the plastic panel structure to expand and contract with respect to said central opening in response to changes in temperature within a range of operating temperatures while providing a stable connection in any direction along said plane between the coextensive peripheral portions of said plastic panel and frame structures throughout the range of operating temperatures.

* * * * *